(12) United States Patent
Sun et al.

(10) Patent No.: US 11,527,849 B2
(45) Date of Patent: Dec. 13, 2022

(54) CHARGING DOCK, ELECTRONIC PRODUCT, CHARGING SYSTEM AND CHARGING METHOD

(71) Applicant: BOE TECHNOLOGY GROUP CO., LTD., Beijing (CN)

(72) Inventors: Junmin Sun, Beijing (CN); Pan Ni, Beijing (CN); Yifei Zhang, Beijing (CN); Yan Ren, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 1102 days.

(21) Appl. No.: 15/944,058

(22) Filed: Apr. 3, 2018

(65) Prior Publication Data

US 2019/0109411 A1 Apr. 11, 2019

(30) Foreign Application Priority Data

Oct. 10, 2017 (CN) .......................... 201710935576.0

(51) Int. Cl.
*H01R 13/62* (2006.01)
*H02J 7/00* (2006.01)
(Continued)

(52) U.S. Cl.
CPC ........ *H01R 13/6205* (2013.01); *H02J 7/0042* (2013.01); *H01R 13/22* (2013.01);
(Continued)

(58) Field of Classification Search
CPC ...... H02J 7/0045; H02J 7/0027; H02J 7/0044; H02J 7/00; H02J 7/0021; H02J 7/0042;
(Continued)

(56) References Cited

U.S. PATENT DOCUMENTS

| | | | |
|---|---|---|---|
| 10,418,863 B1* | 9/2019 | Jadidian | H02J 50/90 |
| 2012/0242279 A1* | 9/2012 | Tso | A47L 9/2868 |
| | | | 320/107 |

FOREIGN PATENT DOCUMENTS

| | | |
|---|---|---|
| CN | 103036261 A | 4/2013 |
| CN | 204118410 U | 1/2015 |

(Continued)

OTHER PUBLICATIONS

First Office Action for Chinese Application No. 201710935576.0, dated Feb. 3, 2020, 10 Pages.

*Primary Examiner* — Nathaniel R Pelton
(74) *Attorney, Agent, or Firm* — Brooks Kushman P.C.

(57) ABSTRACT

A charging dock, an electronic product, a charging system and a charging method are provided. The charging dock includes a housing, a first charging terminal, a first magnetic device, a first detection device and a first control circuit. The first charging terminal, the first magnetic device, the first detection device and the first control circuit are in the housing. The first magnetic device is to attract the charging plug near the first magnetic device to enable the charging plug to move in a direction towards the first charging terminal. The first control circuit is to control the first charging terminal to be energized when the first detection device detects that the first charging terminal is electrically coupled to the charging plug.

10 Claims, 11 Drawing Sheets left ◄──────► right

(51) Int. Cl.
   *H01R 31/06* (2006.01)
   *H01R 13/22* (2006.01)
   *H01R 13/703* (2006.01)
   *H01R 13/631* (2006.01)

(52) U.S. Cl.
   CPC ........ *H01R 13/6315* (2013.01); *H01R 13/703* (2013.01); *H01R 31/065* (2013.01); *H02J 7/00034* (2020.01)

(58) Field of Classification Search
   CPC .......... H02J 7/0063; H02J 50/10; H02J 50/50; H02J 7/00034; H02J 7/0013; H02J 7/0029; H02J 7/0047; H02J 7/025; H02J 7/027; H02J 7/342; H01M 2220/30; H01M 2220/20; H01M 10/425; H01M 2010/4271; H01M 10/4257; H01M 10/44; H01M 10/441; H01M 10/482; H01M 2010/4278; H01M 2/1055; H01M 2/1066; H01M 10/0481; H01M 10/0525; H01M 10/058; H01M 10/0585; H01M 10/465; H01M 10/48; H01M 2200/20; H01M 2/1022; H01M 2/105; H01M 2/1077; H01M 2/1613; H01M 2/206; H01M 2/30; H01M 2/305; H01M 2/34; H01M 2/345; H01M 4/133; H01M 4/661; H01M 4/74; H01R 13/6205; H01R 13/703; H01R 13/6315; H01R 31/065; H01R 13/22
   USPC .......................................................... 320/115
   See application file for complete search history.

(56) References Cited

FOREIGN PATENT DOCUMENTS

| | | | |
|---|---|---|---|
| CN | 103036261 B | * | 2/2015 |
| CN | 106252975 A | * | 12/2016 |
| CN | 106252975 A | | 12/2016 |
| CN | 106785665 A | | 5/2017 |
| CN | 106848777 A | | 6/2017 |
| CN | 107069903 A | | 8/2017 |
| EP | 2284958 A1 | | 2/2011 |
| JP | H05167498 | * | 2/1993 |
| JP | 2009195074 A | * | 8/2009 |

* cited by examiner front ⟷ rear left ←——→ right left ⟷ right

CHARGING DOCK, ELECTRONIC PRODUCT, CHARGING SYSTEM AND CHARGING METHOD

CROSS-REFERENCE TO RELATED APPLICATION

This application claims priority to Chinese Patent Application No. 201710935576.0 filed on Oct. 10, 2017, which is incorporated herein by reference in its entirety.

TECHNICAL FIELD

The present disclosure relates to the field of charging technology, and in particular to a charging dock, an electronic product, a charging system and a charging method.

BACKGROUND

An electronic product in the related art is usually provided with an exposed cable which supplied power for the electronic product. However, the exposed cable adversely affects the overall aesthetics of layout of home furnishing. In order to enhance aesthetics, a battery may be selected to charge the electronic product. However, the battery needs to be recharged after the battery is exhausted.

Thus, how to automatically charge the electronic product without human interference while preventing the cable from exposing a surface of a wall to enhance overall aesthetics of layout of home furnishing, become problems to be solved.

SUMMARY

According to a first aspect of the present disclosure, a charging dock is provided and includes a housing, a first charging terminal, a first magnetic device, a first detection device and a first control circuit. The first charging terminal, the first magnetic device, the first detection device and the first control circuit are in the housing. The first magnetic device is to attract the charging plug near the first magnetic device to enable the charging plug to move in a direction towards the first charging terminal. The first control circuit is to control the first charging terminal to be energized when the first detection device detects that the first charging terminal is electrically coupled to the charging plug.

Optionally, the first charging terminal is slidable between a protruding position and a retracting position; the first detection device is a pressure sensor, and the pressure sensor determines whether the first charging terminal is electrically coupled to the charging plug by detecting pressures applied by the first charging terminal at different positions.

Optionally, the charging dock further includes: a first communication device in the housing. The first communication device is to, when the first detection device does not detect that the first charging terminal is electrically coupled to the charging plug, send a first instruction message to an electric product to which the charging plug belongs, thereby enabling the electric product to control the charging plug to attempt to try to electrically couple to the first charging terminal.

Optionally, the housing includes an insert mating device; the charging dock includes a second detection device in the housing and a second control circuit in the housing; the second detection device is to detect whether the charging plug is inserted into the insert mating device; and the second control circuit is to, when the second detection device detects that the charging plug is inserted into the insert mating device, trigger the first magnetic device to be magnetized.

Optionally, the charging dock further includes: a second communication device. The second communication device is to, when the second detection device detects that the charging plug is not inserted into the insert mating device, send a second instruction message to an electric product to which the charging plug belongs, thereby enabling the electric product to control the charging plug to attempt to try to be inserted into the insert mating device.

Optionally, the charging dock further includes: an elastic device between the first charging terminal and the housing. The elastic device supports the first charging terminal. The first charging terminal compresses the elastic device when the first charging terminal is electrically coupled to the charging plug.

Optionally, the first charging terminal includes an electrode portion and a protruding rod for supporting the electrode portion; the elastic device is disposed around the first charging terminal and is in contact with the electrode portion.

Optionally, the housing further includes a supporting seat above the first detection device in the housing. The supporting seat includes an accommodation space for accommodating the first charging terminal and the elastic device. The supporting seat includes a first opening and a second opening. The first opening is defined in an upper portion of the supporting seat and allows the electrode portion of the first charging terminal to extend outside. The second opening is defined in a lower portion of the supporting seat and allows the protruding rod to extend outside.

Optionally, the housing includes an insert mating device; the insert mating device includes a guide portion that is configured to guide the charging plug to be inserted into the insert mating device.

Optionally, the first charging terminal includes a charging dock positive electrode and a charging dock negative electrode; and the charging dock positive electrode and the charging dock negative electrode are at two sides of the first magnetic device.

According to another aspect of the present disclosure, an electronic product is provided and includes an electric quantity detecting device, a driving device, a charging cable and a charging plug. The charging plug includes a connection terminal, a second charging terminal and a second magnetic device. The connection terminal is to connect with the charging cable. The electric quantity detecting device is to detect an electric quantity of the electric product. The driving device is to retract or release the charging cable connected to the charging plug according to the electric quantity of the electric product detected by the electric quantity detecting device.

Optionally, the charging plug includes a flat curved mating portion at a lower portion of the charging plug; and the second charging terminal and the second magnetic device are on the flat curved mating portion.

Optionally, the driving device is further configured to, when the electric quantity of the electronic product is less than a first threshold, release the charging cable connected to the charging plug to enable the charging plug to attempt to connect with the charging dock; and/or, when the electric quantity of the electronic product is greater than a second threshold when the charging dock charges the electronic product, retract the charging cable to enable the charging plug to escape from the charging dock.

Optionally, the electronic product further includes a communication circuit that is to receive an instruction message sent from the charging dock. The instruction message is to indicate that the charging plug does not reach a charging position. The driving device is to, according to the instruction message received by the communication circuit, first retract the charging cable and then release the charging cable, thereby enabling the charging plug to attempt to connect with the charging dock.

Optionally, the electric product is one of a smart picture frame and a smart photo frame.

According to another aspect of the present disclosure, a charging system for an electronic product is provided and includes: a charging dock, a charging plug, an electric quantity detecting device, a charging cable and a driving device. The charging dock includes a housing, a first charging terminal, a first magnetic device, a first detection device and a first control circuit. The first charging terminal, the first magnetic device, the first detection device and the first control circuit are in the housing. The charging plug includes a connection terminal, a second charging terminal and a second magnetic device. The connection terminal connects with the charging cable. The electric quantity detecting device is to detect an electric quantity of the electric product. The driving device is to retract or release the charging cable connected to the charging plug according to the electric quantity of the electric product detected by the electric quantity detecting device. When releasing the charging cable connected to the charging plug, the first magnetic device engages with the second magnetic device, thereby enabling the second charging terminal to move towards the first charging terminal until the first charging terminal is connected with the second charging terminal. The first control circuit is to control the first charging terminal to be energized when the first detection device detects that the first charging terminal is coupled to the charging plug.

Optionally, the driving device includes a motor; and the charging cable is wound around an output shaft of the motor.

Optionally, the first magnetic device is an electromagnet, and the second magnetic device is a permanent magnet.

According to another aspect of the present disclosure, a charging method for the above charging system is provided and includes: enabling the second charging terminal to move towards the first charging terminal until the first charging terminal is connected with the second charging terminal by means of controlling the first magnetic device to be magnetized and interaction between the first magnetic device and the second magnetic device; and controlling the first charging terminal to be energized.

Optionally, before enabling the second charging terminal to move towards the first charging terminal until the first charging terminal is connected with the second charging terminal by means of controlling the first magnetic device to be magnetized and interaction between the first magnetic device and the second magnetic device, the method further includes: detecting a current electric quantity of an electronic product. When the current electric quantity is less than the first threshold, releasing the charging cable, thereby enabling the charging plug to move towards the charging dock.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Figure 1:
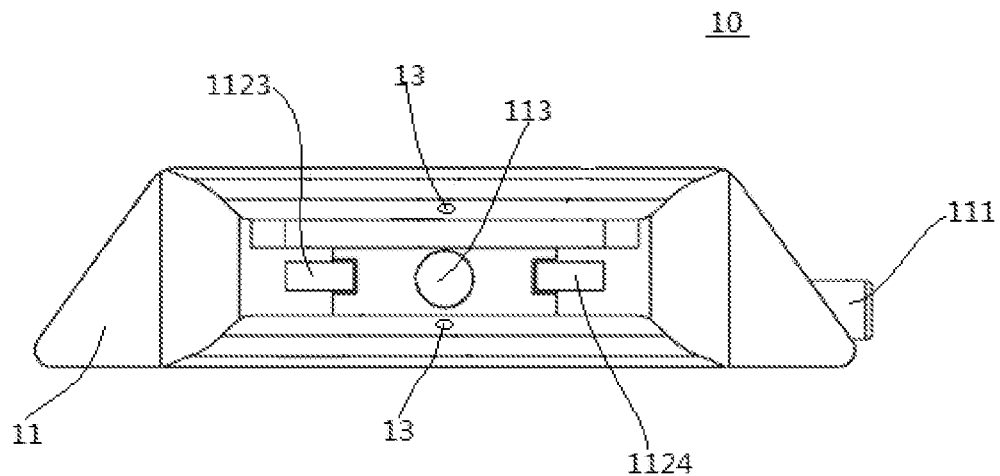
FIG. 1 is a schematic top view of a charging dock according to an embodiment of the present disclosure.

REFERENCE NUMERALS charging dock 10, housing 11, power connection terminal 111, first charging terminal 112, electrode portion 1121, stopping part 11211, protruding rod 1122, charging dock positive electrode 1123, charging dock negative electrode 1124, first magnetic device 113, insert mating device, guide portion 1141, first guiding portion 11411, second guiding portion 11412, elastic device 115, supporting seat 116, first opening 1161, second opening 1162, upper supporting seat 1163, lower supporting seat 1164, positioning rod 11631, positioning groove 117, first detection device 12, second detection device 13;

charging plug 20, connection terminal 21, connection positive terminal 211, connection negative terminal 212, second charging terminal 22, charging positive electrode 221, charging negative electrode 222, second magnetic device 23, curved mating portion 24, fastening screw 25, positioning protrusion 26;

charging cable 30, charging cable positive electrode 31, charging cable negative electrode 32.

DETAILED DESCRIPTION

Detailed description of the exemplary embodiments will be made herein, with examples thereof to be shown in drawings. In the following descriptions, when the drawings are referred to, unless expressed otherwise, the same number in different drawings refers to the same or similar elements. The embodiments described in the exemplary embodiments as below do not represent all embodiments that are consistent with the present disclosure. On the contrary, they are only examples of the devices and the methods that are consistent with some of the aspects of the present disclosure as recited in the claims.

Referring to FIG. 1 to FIG. 18, a charging dock 10, a charging plug 20 and a charging system of embodiments of the present disclosure are described hereinafter.

As shown in FIG. 1 to FIG. 5, the charging dock 10 according to an embodiment of a first aspect of the present disclosure includes a housing 11, a first charging terminal 112, a first magnetic device 113, a first detection device 12 and a first control circuit 18. The first magnetic device 113 is to attract the charging plug 20 near the first magnetic device 113 to enable the charging plug 20 to move in a direction towards the first charging terminal 112. When the first detection device 12 detects that the first charging terminal 112 is electrically coupled to the charging plug 20, the first control circuit controls the first charging terminal 112 to be energized.

It should be noted that the above sentence that the first charging terminal 112 is electrically coupled to the charging plug 20 means that the first charging terminal 112 is in contact with the charging plug 20, and the first control circuit is in an on-state at a contact portion between the first charging terminal 112 and the charging plug 20, but it does not mean that a circuit of the first charging terminal 112 and the charging plug 10 is in a conduction state.

Figure 19:
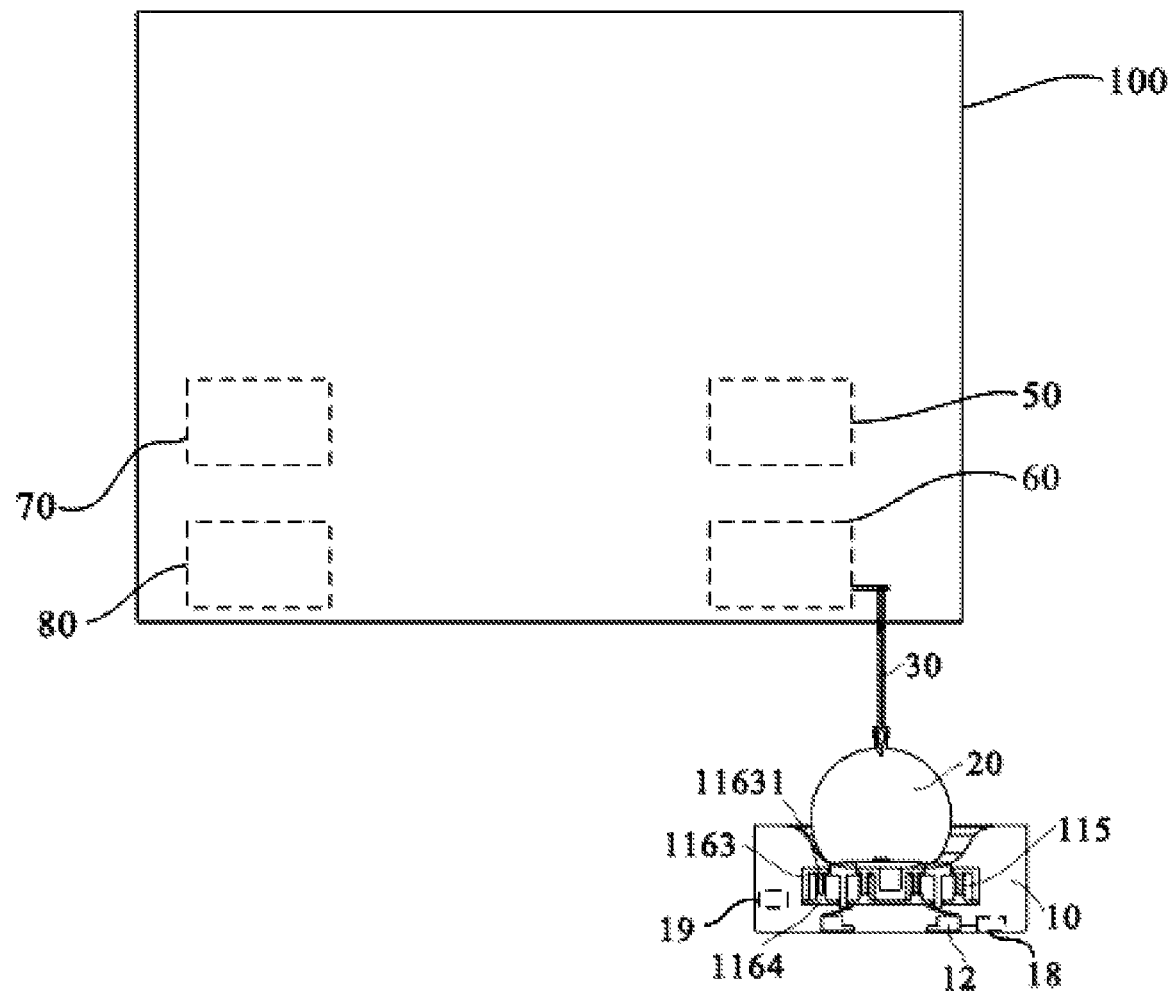
FIG. 19 is a schematic diagram of a charging system according to an embodiment of the present disclosure.

The charging dock 10 according to an embodiment of the first aspect of the present disclosure uses the first magnetic device 113 to attract the charging plug 20 when requiring for charging the charging plug 20. Further, the first detection device 12 detects whether the first charging terminal 112 is in a good contact with the charging plug 20, so that when the first charging terminal 112 is electrically coupled to the charging plug 20, the first control circuit controls the first charging terminal 112 to be electrically coupled to a power connection terminal 111, thereby enabling an external power supply to charge an electric product 100 (as shown in FIG. 19) to which the charging plug 20 belongs through the charging dock 10 and the charging plug 20. No manual intervention is required during utilization of the charging dock 10, the charging plug 20 is automatically attracted to the charging dock 10, and the first charging terminal 112 is controlled to be energized or de-energized according to connection condition between the charging plug 20 and the charging dock 10, thereby automatically charging the electronic product to which the charging plug 20 belongs or automatically disconnecting the external power supply, and thus improving user experience.

Figure 4:
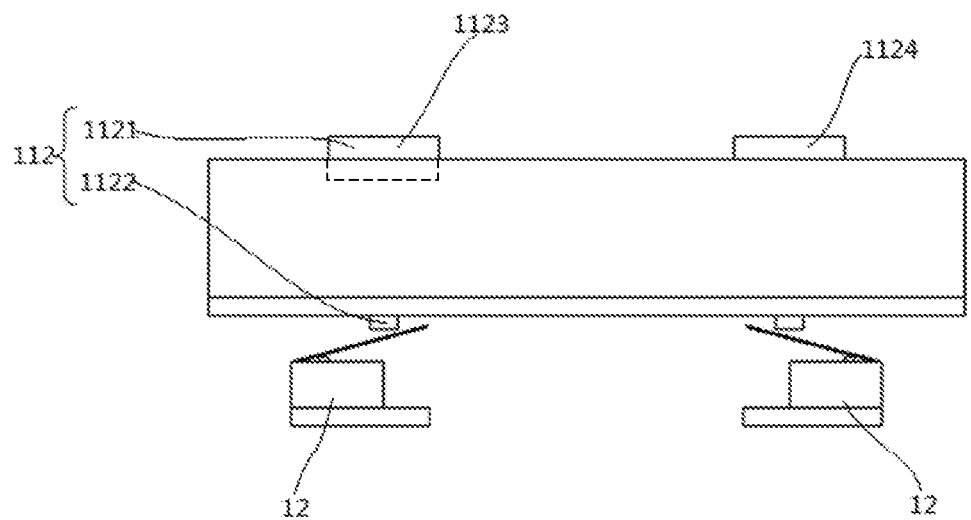
FIG. 4 is a schematic assembly view of a supporting seat, a first detection device and a charging terminal according to an embodiment of the present disclosure.

In addition, the power connection terminal 111 is disposed in the housing. When the first charging terminal 112 is connected with the power connection terminal 111, the first charging terminal 112 is energized. When the first charging terminal 112 is disconnected with the power connection terminal 111, the first charging terminal 112 is de-energized As shown in FIG. 4, the first charging terminal 112 may slide between a protruding position (i.e., a position of the first charging terminal 112 shown with a solid line in FIG. 4) and a retracting position (i.e., a position of the first charging terminal 112 shown with a dotted line in FIG. 4). Specifically, the first detection device 12 may be a pressure sensor and the pressure sensor may determine whether the first charging terminal 112 is electrically connected with the charging plug 20 by detecting pressures applied by the first charging terminal 112 at different positions.

Specifically, the pressure sensor is disposed under the first charging terminal 112. When the first charging terminal 112 is in contact with the charging plug 20, the first charging terminal 112 is pulled by the charging plug 20 back to the retracting position, and then a sensing end of the pressure sensor is subject to a pressure applied by the first charging terminal 112 and sends a detection message to the first control circuit. The first control circuit receives the detection message and then controls the first charging terminal 112 to be connected with the power connection terminal 111.

When the first charging terminal 112 is disconnected with the charging plug 20, the first charging terminal 112 moves to the retracting position, and then the pressure sensor is subject to no pressure or less pressure and sends a detection message to the first control circuit. The first control circuit receives the detection message, determines that the first charging terminal 112 is not in electrical contact with the charging plug 20 and then controls the first charging terminal 112 to be disconnected with the power connection terminal 111. In this way, the pressure sensor can detect whether the first charging terminal 112 is in an electrical contact with the charging plug 20 with faster response speed, high sensitivity and high reliability.

Optionally, the charging dock 10 further includes a first communication device 19 (as shown in FIG. 19) disposed in the housing 11. The first communication device 19 is to, when the first detection device 12 does not detect that the first charging terminal 112 is in electrical contact with the charging plug 20, send a first instruction message to the electric product 100 to which the charging plug 20 belongs, thereby enabling the electric product 100 to control the charging plug 20 to attempt to try to electrically connect with the first charging terminal 112.

The first communication device 19 may send a corresponding signal according to a detection result of the first detection device 12. For example, when the first charging terminal 112 is not in electrical contact with the charging plug 20, the first communication device may send the first instruction message to the electric product 100 to which the charging plug 20 belongs, thereby controlling the charging plug 20 to first move away from the charging dock 10 and then move towards the charging dock 10 so as to attempt to try to electrically connect the charging plug 20 with the first charging terminal 112. In this way, the position of the charging plug 20 is adjusted until the first charging terminal 112 is in electrical contact with the charging plug 20. When the first charging terminal 112 is in electrical contact with the charging plug 20, the first communication device may not send the first instruction message to the electric product 100 to which the charging plug 20 belongs, and then the position of the charging plug 20 is not needed to be adjusted.

Thus, the presence of the first communication device 19 enables the electric product to drive the charging plug to operate according to the detection result of the first detection device 12, thereby improving linkage relationship between the charging dock 10 and the electric product.

In other embodiment, the first communication device 19 may be to, when the first detection device 12 detects that the first charging terminal 112 is in electrical contact with the charging plug 20, send a first instruction message to the electric product 100 to which the charging plug 20 belongs. The electric product 100 receives the first instruction message and does not interfere with the operation of the charging plug 20. When the electric product 100 does not receive the first instruction message within a preset period, the electric product 100 controls the charging plug 20 to first move away from the charging dock 10 and the move towards the charging dock 10, so as to attempt to try to electrically connect the charging plug 20 with the first charging terminal 112.

Figure 11:
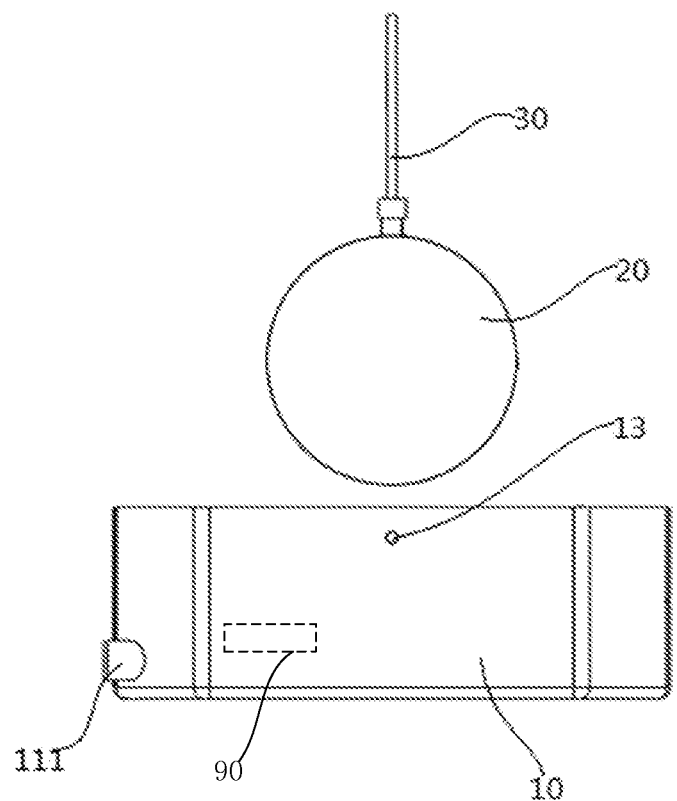
FIG. 11 is a schematic front view of the charging plug and the charging dock according to an embodiment of the present disclosure.
Figure 12:
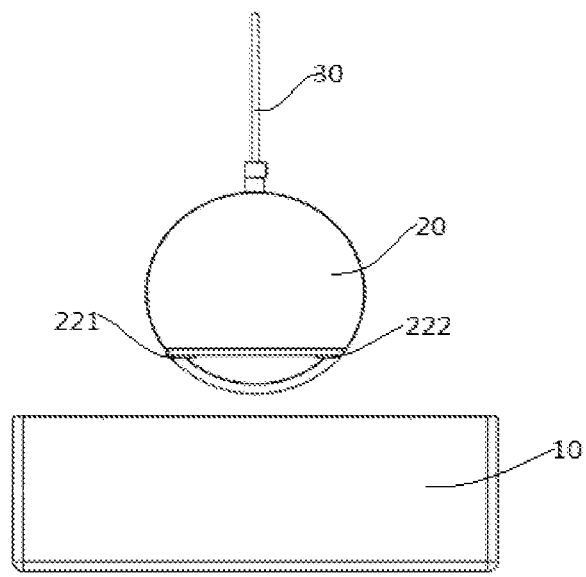
FIG. 12 is a schematic rear view of the charging plug and the charging dock according to an embodiment of the present disclosure.

As shown in FIG. 5 to FIG. 9, the charging dock 10 includes a second detection device 13 disposed on the housing 11 and a second control circuit 90 (as shown in FIG. 11). The second detection device 13 is to detect whether the charging plug 20 is inserted into the charging dock 10. The second control circuit 90 is to, when the second detection device 13 detects that the charging plug 20 is inserted into the charging dock 10, trigger the first magnetic device 113 to generate a magnetic field.

As mentioned above, when the second detection device 13 detects that the charging plug 20 is inserted into the charging dock 10, the second control circuit controls the first magnetic device 113 to generate a magnetic field according to a detection result of the second detection device 13, thereby enabling the charging dock 10 to be magnetically attracted to the charging plug 20. In this way, under the effect of magnetic attraction, the charging plug 20 can be moved quickly and accurately to a charger position, and stability and reliability of the engagement between the charging plug 20 and the charging dock 10 can be improved.

Optionally, the charging dock 10 may further include a second communication device. The second communication device is to, when the second detection device 13 detects that the charging plug 20 is not inserted into the charging dock 10, send a second instruction message to the electric product 100 to which the charging plug 20 belongs, thereby enabling the electric product to control the charging plug 20 to attempt to try to be inserted into the charging dock 10.

Specifically, the second communication device timely sends the second instruction message to the electric product according to the detection result of the second detection device 13. For example, when the charging plug 20 is not inserted into the charging dock 10, the second communication device transmits the second instruction message to the electric product, thereby enabling the charging plug 20 to first return back and then is moved again until the charging plug 20 is inserted into the charging dock 10, thereby improving accuracy of the engagement between the charging plug 20 and the charging dock 10.

In other embodiments, the second communication device may be used to, when the second detection device 13 detects that the charging plug 20 is inserted into the charging dock 10, send a second instruction message to the electric product 100 to which the charging plug 20 belongs. The electric product 100 receives the second instruction message and does not interfere with the operation of the charging plug 20. When the electric product 100 does not receive the second instruction message within a preset period, the electric product 100 controls the charging plug 20 to first move away from the charging dock 10 and the move towards the charging dock 10, so as to attempt to try to electrically connect the charging plug 20 with the first charging terminal 112.

It should be noted that the first communication device and the first detection device 12 may be integrated together to form a component. The second communication device and the second detection device 13 may also be integrated together to form a component. In one embodiment, the second communication device and the second detection device 13 may integrated together to form an infrared sensor, in other words, the second communication device and the second detection device 13 may be implemented as an infrared sensor.

Figure 10:
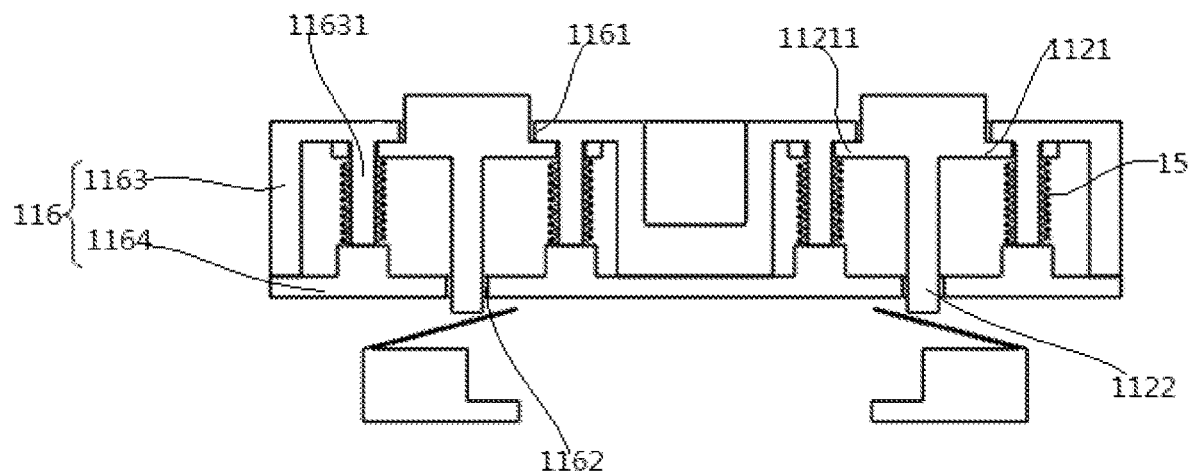
FIG. 10 is a schematic sectional view of the supporting seat, the first detection device and the charging terminal according to an embodiment of the present disclosure.

As shown in FIG. 10, an elastic device 115 is disposed between the first charging terminal 112 and the housing 11 and supports the first charging terminal 112. When the first charging terminal 112 is in electrical contact with the charging plug 20, the first charging terminal 112 compresses the elastic device 115.

Specifically, the elastic device 115 is disposed below the first charging terminal 112, and is used to pull the first charging terminal 112 to the protruding position when the first charging terminal 112 is not in contact with the charging plug 20. When the first charging terminal 112 is in electrical contact with the charging plug 20, the first charging terminal 112 moves downwards and compresses the elastic device 115. When the first charging terminal 112 is separated from the charging plug 20, the elastic device 115 enables the first charging terminal 112 to return back to the protruding position.

In this way, the presence of the elastic device 115 enables the first charging terminal 112 to be normally at the protruding position, thereby enabling the first detection device 12 to detect accurately the pressure applied by the first charging terminal 112 and enhancing the connection between the first charging terminal 112 and the charging plug 20 when the first charging terminal 112 is in electrical contact with the charging plug 20.

It should be noted that the elastic device 115 may be a spring, or elastic insulation rubber.

In the embodiment shown in FIG. 10, the first charging terminal 112 includes an electrode portion 1121 and a protruding rod 1122 for supporting the electrode portion 1121. The elastic device 115 is disposed around the first charging terminal 112 and is in contact with the electrode portion 1121.

The electrode portion 1121 is fixed connected with a top portion of the protruding rod 1122. A stopping part 11211 extends radially and outwardly from an end of the electrode portion 1121 at which the electrode portion 1121 is connected with the protruding rod 1122. The elastic device 115 is disposed around the protruding rod 1122, and an end of the elastic device 115 is in contact with the stopping part 11211, and the other end of the elastic device 115 abuts against the housing 11. In this way, the elastic device 115 provides a better supporting effect for the electrode portion 1121 and distributes force evenly on the electrode portion 1121, thereby enabling the electrode portion 1121 to be in sufficient contact with the charging plug 20 and then improving stability and reliability of the engagement between the charging plug 20 and the first charging terminal 112.

Figure 2:
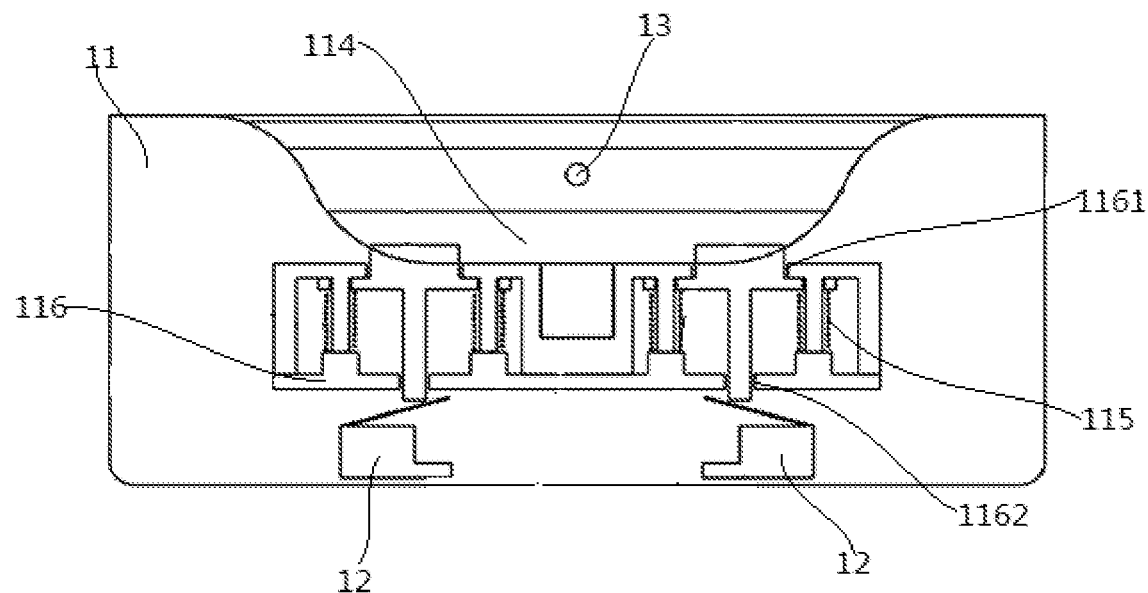
FIG. 2 is a schematic sectional view of the charging dock according to an embodiment of the present disclosure.
Figure 8:
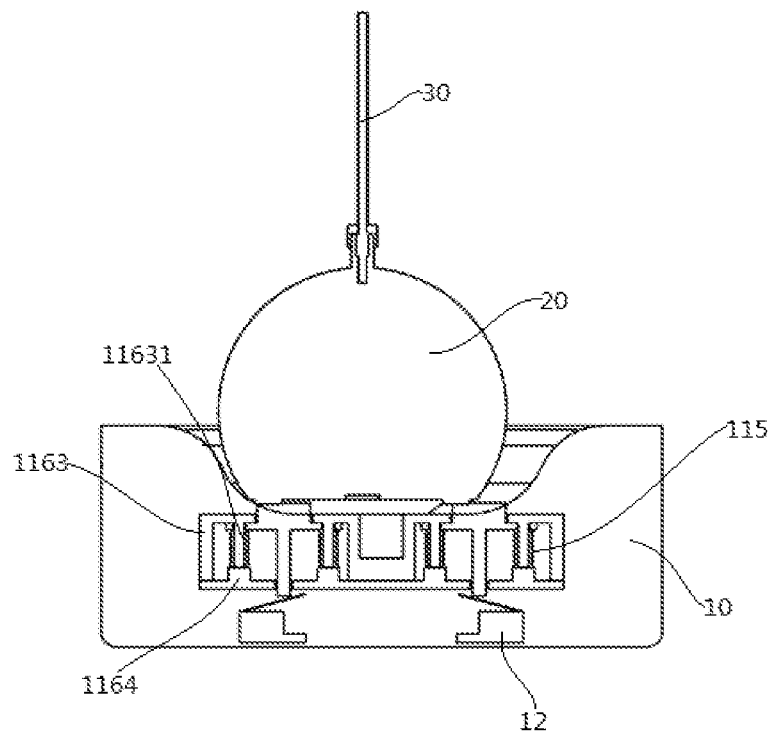
FIG. 8 is a schematic diagram showing that a charging plug enters a charging dock (guided by a guide portion in left and right directions) according to an embodiment of the present disclosure.

As shown in FIG. 2 and FIG. 8, a supporting seat 116 is disposed in the housing 11 and is above the first detection device 12. The supporting seat 116 includes an accommodation space for accommodating the first charging terminal 112 and the elastic device 115. The supporting seat 116 includes a first opening 1161 and a second opening 1162. The first opening 1161 is defined in an upper portion of the supporting seat 116 for allowing the electrode portion 1121 of the first charging terminal 112 to extend outside. The second opening 1162 is defined in a lower portion of the supporting seat 116 for allowing the protruding rod 1122 to extend outside.

Specifically, the supporting seat 116 includes an upper supporting seat 1163 and a lower supporting seat 1164. A positioning rod 11631 is disposed on one of the upper supporting seat 1163 and the lower supporting seat 1164. The elastic device 115 is disposed around the positioning rod 11631. The accommodation space is defined between the upper supporting seat 1163 and the lower supporting seat 1164.

In this way, not only the elastic device 115 disposed around the positioning rod 11631 can elastically support the first charging terminal 112 to enable the connection between the elastic device 115 and the supporting seat 116 to be more stable, but also the accommodation space defined in the supporting seat 116 facilitates installation of the first charging terminal 112 and the elastic device 115 to improve structural stability of the charging dock 10.

Figure 3:
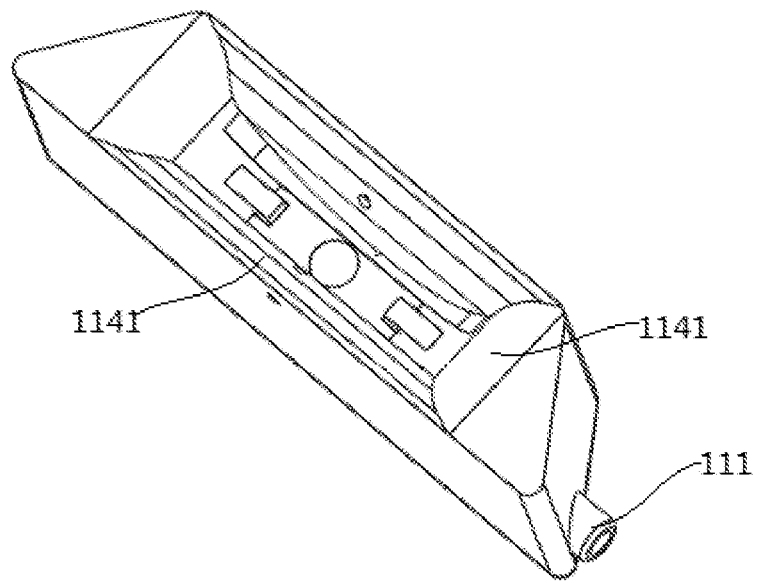
FIG. 3 is a schematic perspective view of the charging dock according to an embodiment of the present disclosure.

As shown in FIG. 2 and FIG. 3, the housing includes an insert mating device 114. The insert mating device 114 includes a guide portion 1141 that is used to guide the charging plug 20 to be inserted into the insert mating device 114. An inner wall of the housing 11 obliquely extends outwardly and upwardly from an inner side to an outside, thereby defining the guide portion 1141. The presence of the guide portion 1141 enables the charging plug 20 which may swing back and forth, swing left and right or swing irregularly to move towards the final charging position, thereby improving stability of automatic charging function of the electric product.

Figure 5:
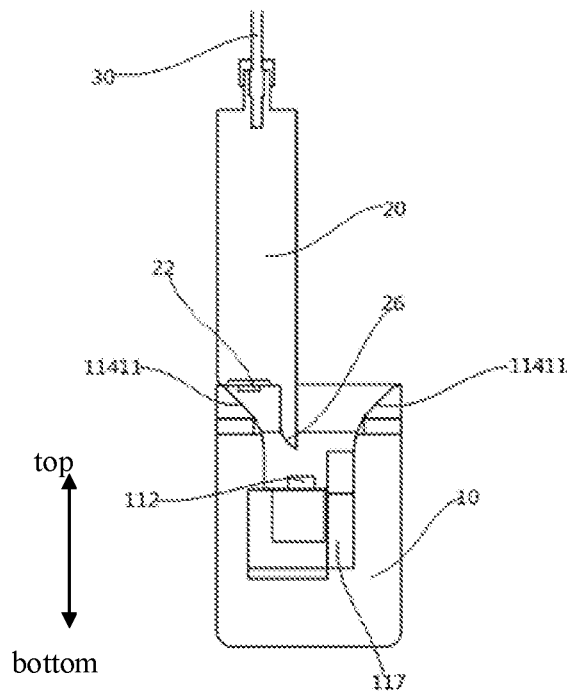
FIG. 5 is a schematic diagram showing that a charging plug enters a charging dock (guided by a guide portion in front and rear directions) according to an embodiment of the present disclosure.
Figure 6:
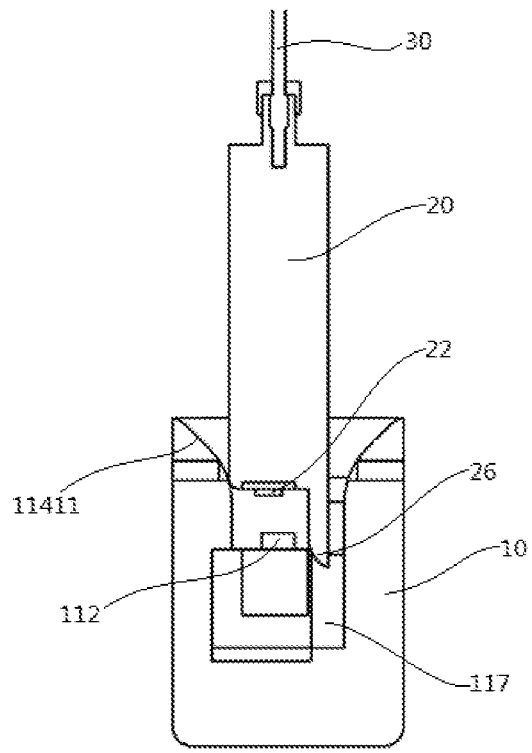
FIG. 6 is a schematic diagram showing that the charging plug engages with the charging dock (guided by the guide portion in the front and rear directions) according to an embodiment of the present disclosure.
Figure 7:
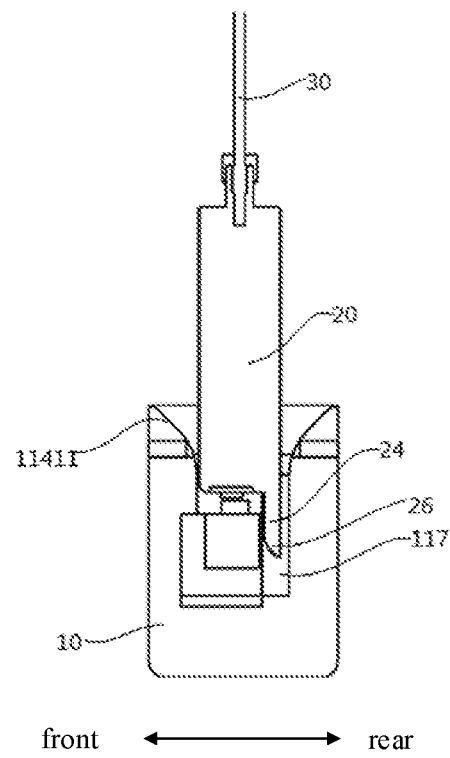
FIG. 7 is a schematic diagram showing an electrical between the charging plug and the charging dock according to an embodiment of the present disclosure.
Figure 9:
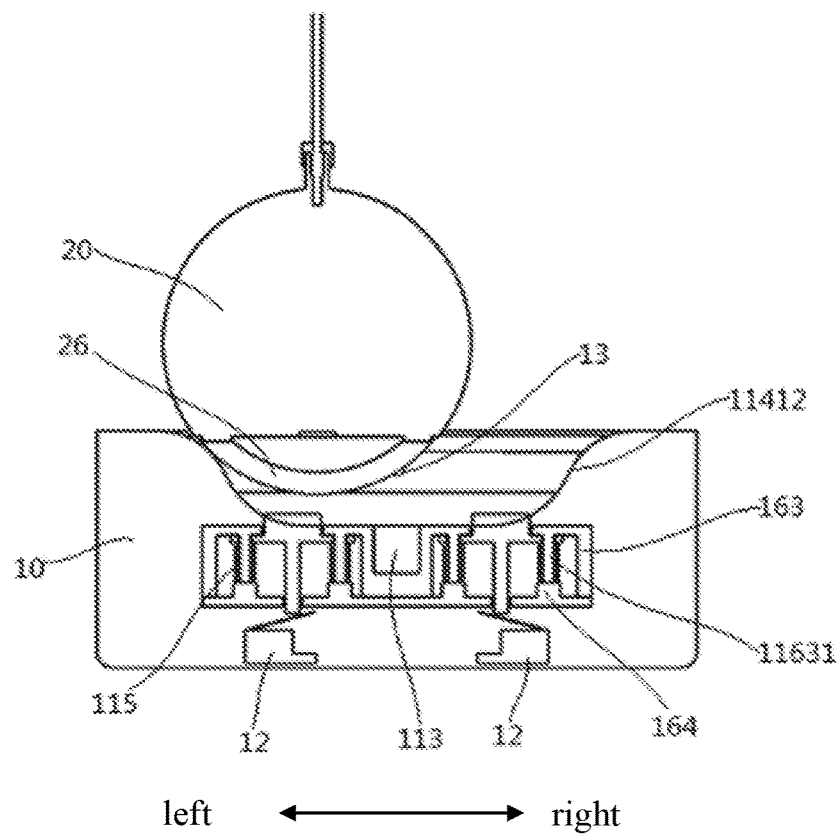
FIG. 9 is a schematic diagram showing that the charging plug engages with the charging dock (guided by the guide portion in the left and right directions) according to an embodiment of the present disclosure.

Specifically, as shown in FIG. 5 to FIG. 9, the guide portion 1141 includes a first guiding portion 11411 and a second guiding portion 11412. The first guiding portion 11411 guides the charging plug 20 in a direction perpendicular to the charging plug 20. The housing 11 includes a first side wall, a second side wall, a third side wall and a fourth side wall. The first side wall, the second side wall, the third side wall and the fourth side wall are connected in sequence. The first side wall is opposite to the third side wall. The second side wall is opposite to the fourth side wall. Each of the first side wall, the second side wall, the third side wall and the fourth side wall is curved and extends outwardly from bottom to up. Each of the first side wall and the third side wall defines one first guiding portion 11411 (as shown in FIG. 5 to FIG. 7). The second guiding portion 11412 guides the charging plug 20 in a direction parallel to the charging plug 20. Each of the second side wall and the fourth side wall defines one second guiding portion 11412 (as shown in FIG. 8 and FIG. 9).

In this way, the presence of the first guiding portion 11411 enables the charging plug 20 which swings back and forth to move towards the charging position under the effect of the first guiding portion 11411. The presence of the second guiding portion 11412 enables the charging plug 20 which swings left and right to move towards the charging position under the effect of the second guiding portion 11412. Thus, the presence of the first guiding portion 11411 and the second guiding portion 11412 enables the swinging charging plug 20 to move to the charging position, thereby further improving stability of automatic charging function of the electric product.

The insert mating device 114 may be used to assist the insertion of the charging plug 20. As an example, the insert mating device 114 may be a slot or opening.

Optionally, as shown in FIG. 1 and FIG. 4, the first charging terminal 112 includes a charging dock positive electrode 1123 and a charging dock negative electrode 1124. The charging dock positive electrode 1123 and the charging dock negative electrode 1124 are at two sides of the first magnetic device 113. As a result, this not only improves safety of the charging dock 10, but also enables arrangement of the charging dock positive electrode 1123, the charging dock negative electrode 1124 and the first magnetic device 113 on the charging dock 10 to be more reasonable.

As shown in FIG. 11 to FIG. 13 and FIG. 19, an electric product 100 according to embodiments of the second aspect of the present disclosure includes an electric quantity detecting device 50, a driving device 60, a charging cable 30 and a charging plug 20. The charging plug 20 includes a connection terminal 21, a second charging terminal 22 and a second magnetic device 23. The connection terminal 21 is used to connect with the charging cable 30. The electric quantity detecting device 50 is used to detect an electric quantity of the electric product 100. The driving device 60 is used to retract or release the charging cable 30 connected to the charging plug 20.

Thus, when the electric quantity detecting device 50 detects that an electric quantity of a battery 80 (as shown in FIG. 19) in the electric product 100 is insufficient, the driving device 60 releases the charging cable 30 connected to the charging plug 20, thereby enabling the charging plug 20 to move towards the charging dock 10 and then realizing automatic charging of the electronic product. After the battery is fully charged, the driving device 60 retracts the charging cable 30 connected to the charging plug 20, thereby separating the charging plug 20 from the charging dock 10 and then realizing automatic power off after the battery is fully charged. In this way, the electric product 100 can save energy while avoiding unattractive appearance caused by the charging cable 30 which is always exposed. Further, after the electric product 100 is automatically charged or disconnected with the power supply, the charging cable 30 can be automatically collected without human interference.

Figure 16:
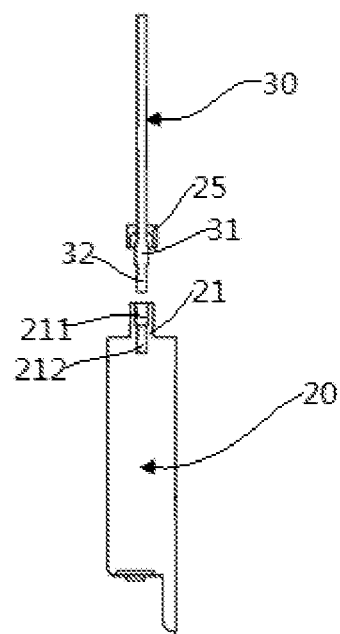
FIG. 16 is a schematic diagram showing that the charging plug is separated from the charging cable according to an embodiment of the present disclosure.

It should be noted that the second charging terminal 22 includes a charging positive electrode 221 and a charging negative electrode 222. The charging positive electrode 221 and the charging negative electrode 222 are at two sides of the second magnetic device 23. The charging positive electrode 221 is electrically connected with the charging dock positive electrode 1123. The charging negative electrode 222 is electrically connected with the charging dock negative electrode 1124. As shown in FIG. 16, the connection terminal 21 includes a connection positive terminal 211 and a connection negative terminal 212. The charging cable 30 includes a charging cable positive electrode 31 and a charging cable negative electrode 32. The connection positive terminal 211 is electrically connected with the charging cable positive electrode 31. The connection negative terminal 212 is electrically connected with the charging cable negative electrode 32. A fastening screw 25 is sleeved on the charging cable 30 and is used to firmly connect the charging cable 30 with the charging plug 20.

Figure 13:
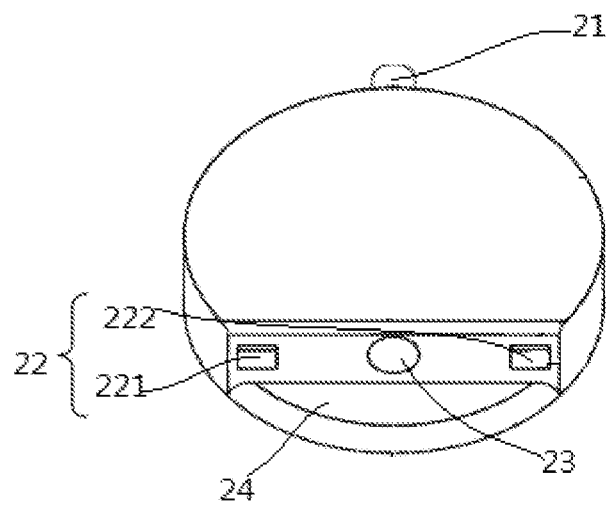
FIG. 13 is a schematic perspective view of the charging plug according to an embodiment of the present disclosure.
Figure 14:
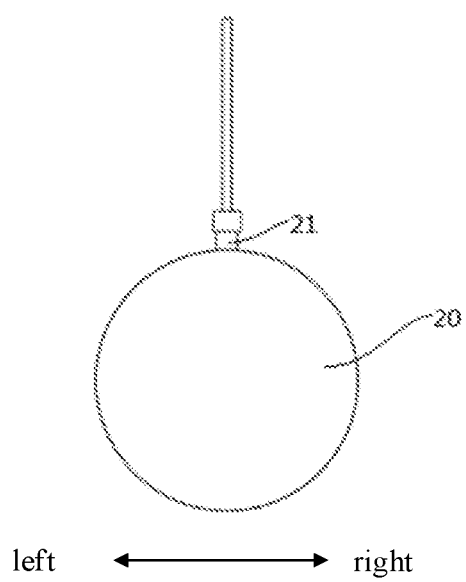
FIG. 14 is a schematic front view of the charging plug and a charging cable according to an embodiment of the present disclosure.

Optionally, a flat curved mating portion 24 (as shown in FIG. 13 and FIG. 14) is provided at a lower portion of the charging plug 20. The second charging terminal 22 and the second magnetic device 23 are on the flat curved mating portion 24. In this way, the flat curved mating portion 24 may reduce rotation of the charging plug 20 relative to the charging dock 10 and limit the movement of the charging plug 20 to swinging, thereby reducing the movement range of the charging plug 20 and enabling the charging plug 20 to always be able to move to the final charging position.

In addition, since both of the second charging terminal 22 and the second magnetic device 23 are on the curved mating portion 24, this facilitates electrical connection between the second charging terminal 22 and the first charging terminal 112 and facilitates magnetic connection between the first magnetic device 113 and the second magnetic device 23.

It should be noted that the second magnetic device 23 is a permanent magnet and the first magnetic device 113 is an electromagnet, then when the charging plug 20 is inserted into the charging dock 10, the first magnetic device 113 generates a magnetic field so as to adsorb the second magnetic device 23. When the charging plug 20 is away from the charging dock 10 or after completion of charging of the electronic product, the magnetic field generated by the first magnetic device 113 disappears. In this way, only when the charging plug 20 is inserted into the charging dock 10, the first magnetic device 113 is triggered to generate a magnetic field, this not only enables the magnetic connection between the first magnetic device 113 and the second magnetic device 23 to be stable, but also facilitates separating the first magnetic device 113 from the second magnetic device 23 and makes the electronic product more energy-efficient.

Optionally, the driving device is used to, when the electric quantity of the electronic product is less than a first threshold, release the charging cable 30 connected to the charging plug 20 to enable the charging plug 20 to attempt to connect with the charging dock 10. The driving device is further used to, when the electric quantity of the electronic product is greater than a second threshold in the process of charging the electronic product, retract the charging cable 30 connected to the charging plug 20 to enable the charging plug 20 to escape from the charging dock 10.

Figure 15:
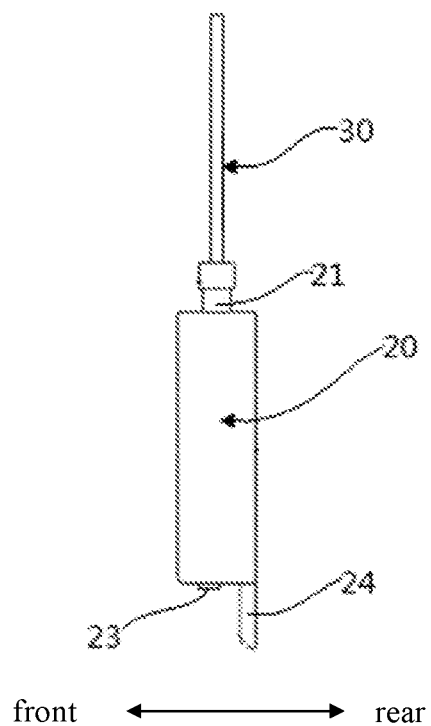
FIG. 15 is a schematic side view of the charging plug and the charging cable according to an embodiment of the present disclosure.

That is to say, when the electric quantity of the electronic product is less than the first threshold, the driving device drives the charging plug 20 to move towards the charging dock 10 until the charging plug 20 is inserted into the charging dock 10, thereby charging the electronic product; when the electric quantity of the electronic product is greater than the second threshold, the driving device drives the charging plug 20 to separate from the charging dock 10, thereby stopping charging the electronic product (as shown in FIG. 15 and FIG. 16). Thus, the presence of the driving device and the charging cable 30 can enable the charging plug 20 to be close to or move away from the charging dock 10.

In one embodiment, the electronic product further includes a communication circuit 70 that is used to receive the instruction message sent from the charging dock 10. The instruction message is used to indicate that the charging plug 20 does not reach the charging position. The driving device is used to, according to the instruction message received by the communication circuit 70, first retract the charging cable 30 and then release the charging cable 30, thereby enabling the charging plug 20 to attempt to connect with the charging dock 10. The presence of the communication circuit enables the electronic produce to communicate with the charging dock 10, thereby enabling the charging plug 20 to be quickly inserted into the charging dock 10 or to be separated from the charging dock 10, and then improving stability of automatic charging function of the electric product.

Optionally, the electric product may one of a smart picture frame and a smart photo frame. Then, the charging plug 20 and the charging dock 10 are coupled to the electric product and located between the electric product and a wall, and the charging cable 30 is hidden between the electric product and the wall, thereby improving aesthetics of home furnishing.

A charging system according to embodiments of the third aspect of the present disclosure includes the above charging dock 10 and the above charging plug 20.

The charging system can not only automatically charge the electronic product, but also collects and hides the charging cable 30 when not charging the electronic product, thereby improving aesthetics of home furnishing.

As shown in FIG. 5, FIG. 6 and FIG. 7, a positioning groove 117 is defined in a bottom of the housing 11 and is recessed downward. The charging plug 20 includes a positioning protrusion 26 that engages with the positioning groove 117. The presence of the positioning protrusion 26 and the positioning groove 117 enables the charging plug 20 to better match the charging dock 10, and provides more accurate positioning in the process of inserting the charging plug 20 into the charging dock 10.

Exemplary examples of a charging system and a charging process of the present disclosure are described hereinafter in conjunction with FIG. 9 and FIG. 10.

The charging system is composed of a driving device 60 such as a motor, an electric quantity detecting device 50, a first detection device 12, a second detection device 13, a charging cable 30, a charging plug 20 and a charging dock 10.

The first detection device 12 and the second detection device 13 are mounted on the charging dock 10. The charging cable 30 is wound around the driving device 60. The driving device 60 can retract or release the charging cable 30. An end of the charging plug 20 is connected with the charging cable 30. The other end of the charging plug 20 is provided with a second charging terminal 22 and a second magnetic device 23, and engages with the charging dock 10 by means of inserting the charging plug 20 into the charging dock 10. Then, a first charging terminal 112 and a first magnetic device 113 of the charging dock 10 are connected with the second charging terminal 22 and the second magnetic device 23, respectively.

In this way, the electric quantity detecting device 50 can detect in time an electric quantity of the electronic product. When the electric quantity of the electronic product is insufficient (i.e., less than a first threshold), the electric quantity detecting device triggers the driving device to release the charging cable 30, thereby enabling the charging plug 20 to move towards the charging dock 10. The second detection device 13 detects a position of the charging plug 20. When the charging plug 20 is inserted in the charging dock, the first magnetic device 113 is controlled to generate a magnetic field that enables the first magnetic device 113 to attract the second magnetic device 23, thereby driving the second charging terminal 22 of the charging plug 20 to move towards the first charging terminal 112 of the charging dock 10 until the first charging terminal 112 engages with the second charging terminal 22. Then, the first detection device 12 detects whether the first charging terminal 112 is electrically connected with the second charging terminal 22. When the first charging terminal 112 is electrically connected with the second charging terminal 22, a charging circuit in the charging dock 10 is controlled to be switched on, thereby charging the electronic product. When the first charging terminal 112 is not electrically connected with the second charging terminal 22, the charging plug 20 is pulled up to an initial position and then the above movement is repeated.

When the electric quantity of the electronic product is greater than a second threshold, a power connection terminal 111 of the charging dock 10 is controlled to be disconnected with the first charging terminal 112, the first magnetic device 113 is controlled to be powered off and then the magnetic field generated by the first magnetic device 113 disappears, and then, the driving device controls the charging plug 20 to be retracted. At this point, the charging dock 10 is separated from the charging plug 20, and the charging plug 20 returns back to the initial position and stops charging the charging dock 10.

In addition, in the above process, when the charging plug 20 is not inserted in the charging dock 10, the driving device drives the charging plug 20 to move away from the charging dock 10 and return back to the initial position, and then drives the charging plug 20 to move towards the charging dock 10 again until the charging plug 20 is inserted in the charging dock 10.

As described above, the above charging system can intelligently and automatically charge the electronic product when the electric quantity of the electronic product is insufficient, and can automatically disconnect the electronic product with the power supply and collect the charging cable. Further, the above charging system has better aesthetics.

An exemplary example of a charging method for the charging system of the present disclosure is described hereinafter in conjunction with FIG. 17 and FIG. 18.

Figure 17:
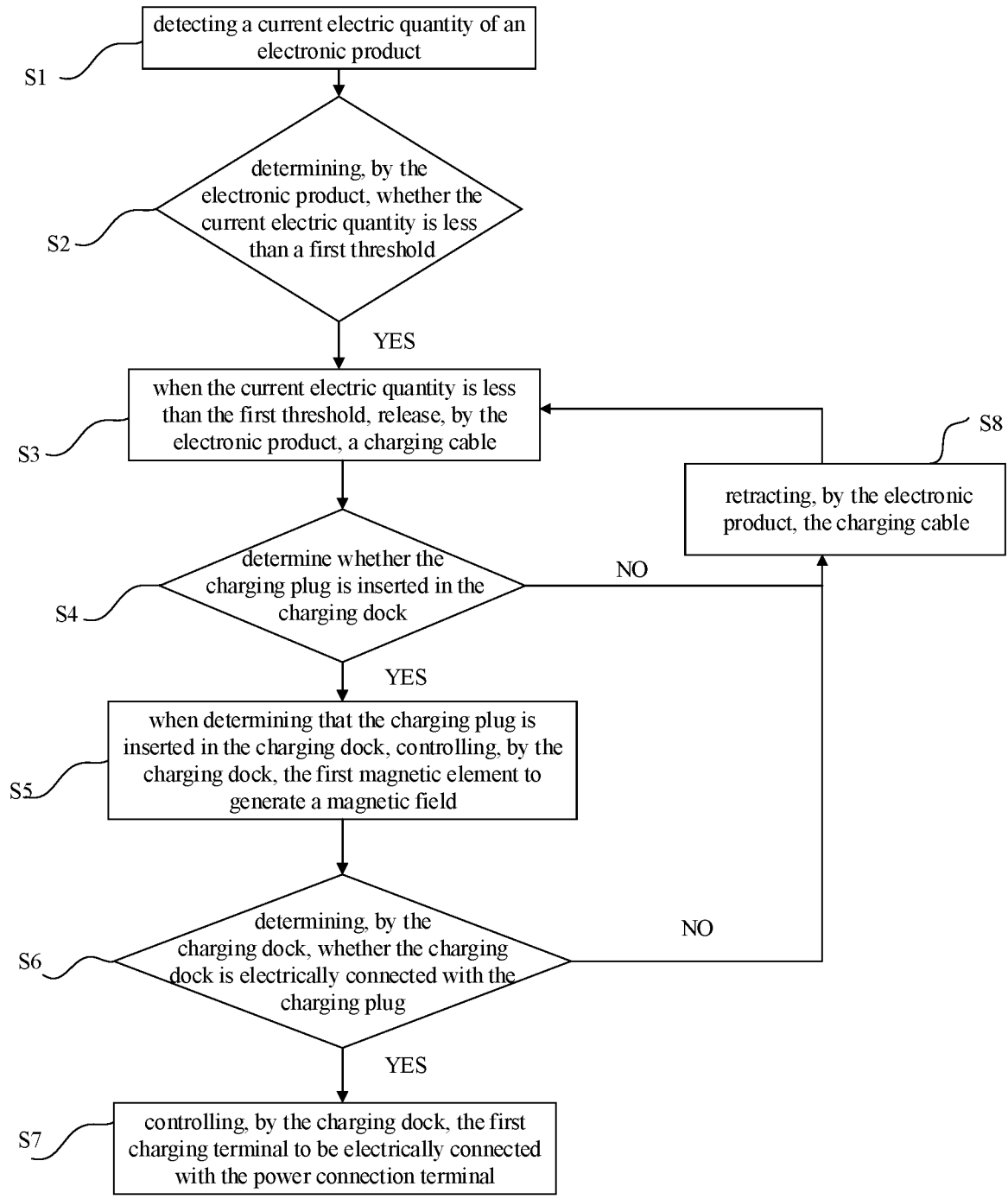
FIG. 17 is a flow chart of a charging method for a charging system according to an embodiment of the present disclosure.

As shown in FIG. 17, a charging method according to one embodiment of the present disclosure includes the following steps S1 to S8.

The step S1 is to detect a current electric quantity of an electronic product. Specifically, after the electronic product has been used for a period of time, an electric quantity of a battery 80 can be detected.

The step S2 is to determine, by the electronic product, whether the current electric quantity is less than a first threshold. When the current electric quantity is less than the first threshold, it indicates that the electric quantity of the battery of the electronic product is insufficient.

The step S3 is to, when the current electric quantity is less than the first threshold, release, by the electronic product, a charging cable, thereby enabling the charging plug to move towards the charging dock.

The step S4 is to determine whether the charging plug is inserted in the charging dock.

When determining that the charging plug is not inserted in the charging dock, a second instruction message may be sent to the electronic product. Based on the second instruction message, the charging plug may retract the charging cable and controls the charging plug to attempt to try to be inserted in the charging dock.

The step S5 is to, when determining that the charging plug is inserted in the charging dock, controlling, by the charging dock, the first magnetic device to generate a magnetic field.

Optionally, when it is detected by means of infrared light induction lamps and so on, that the charging plug is inserted in the charging dock, the first magnetic device of the charging dock is powered and then generates a magnetic field, thereby enabling the first magnetic device of the charging dock to attract the second magnetic device of the charging plug, and then enabling connection between the charging plug and the charging dock to be tight and improving positioning accuracy.

The step S6 is to, determine, by the charging dock, whether the charging dock is electrically connected with the charging plug.

Specifically, it may be determined whether the first charging terminal of the charging dock is electrically connected with the charging plug. The first charging terminal of the charging dock includes a charging dock positive electrode and a charging dock negative electrode. The charging plug includes a second charging terminal. The second charging terminal includes a charging positive electrode and a charging negative electrode. When the charging positive electrode is electrically connected with the charging dock positive electrode and the charging positive electrode is electrically connected with the charging dock positive electrode, it is determined whether the first charging terminal of the charging dock is electrically connected with the charging plug. Optionally, whether the first charging terminal of the charging dock is electrically connected with the second charging terminal of the charging plug may be determined by the pressure detected by the first detection device.

The step S7 is to, when the charging dock is electrically connected with the charging plug, control, by the charging dock, the first charging terminal to be electrically connected with the power connection terminal.

The step S8 is to, when the charging plug is not inserted in the charging dock or the charging dock is not electrically connected with the charging plug, retracting, by the electronic product, the charging cable. Specifically, when the second detection device detects that the charging plug is not inserted in the charging dock according to an infrared sensing signal, the second communication device in the charging dock sends the second instruction message to the electronic product. Based on the second instruction message, the driving device retracts the charging cable connected with the charging plug, and enables the charging plug to attempt to try to be inserted in the charging dock. When the first detection device detects that the first charging terminal of the charging dock is not electrically connected with the charging plug according to a pressure signal, the first communication device (i.e., infrared sensor) of the charging dock sends the first instruction message to the electronic product. Based on the first instruction message, the driving device retracts the charging cable connected with the charging plug, and enables the charging plug to attempt to try to be electrically connected with the charging dock.

Figure 18:
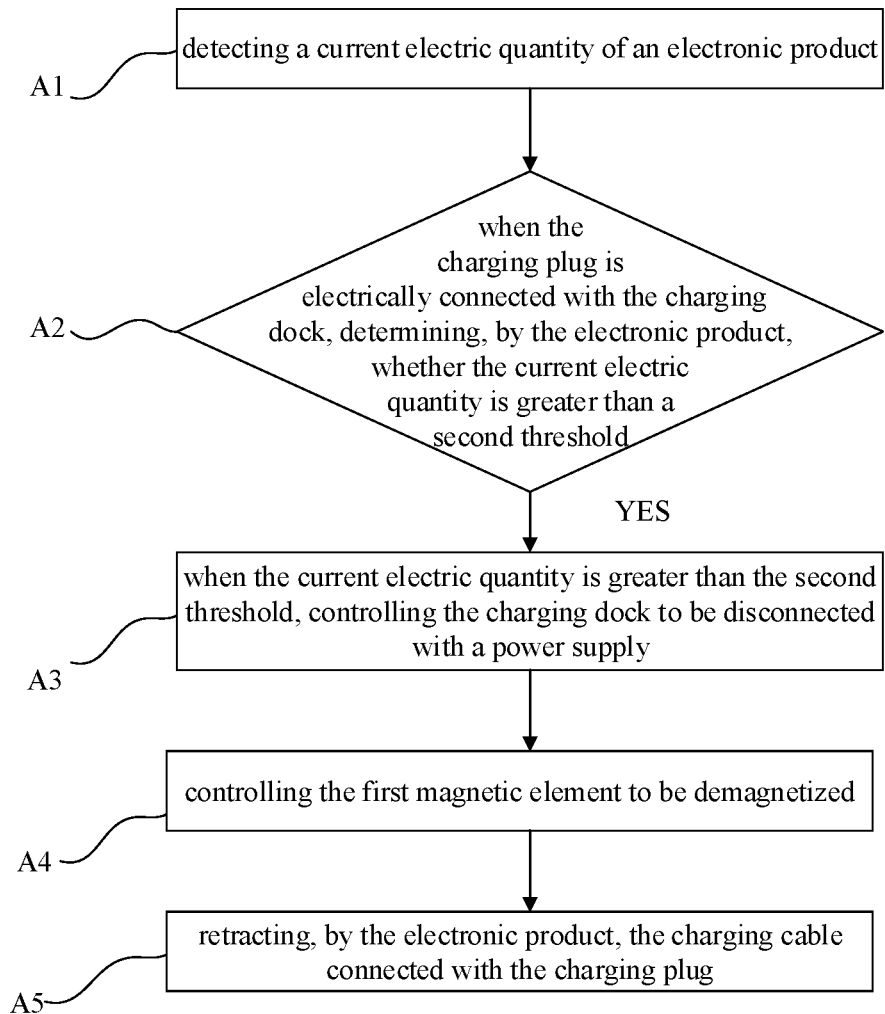
FIG. 18 is another flow chart of a charging method for a charging system according to an embodiment of the present disclosure.

As shown in FIG. 18, a charging method according to one embodiment of the present disclosure includes the following steps A1 to A5.

The step A1 is to detect a current electric quantity of an electronic product. Specifically, after the electronic product has been charged for a period of time, an electric quantity of a battery of the electronic product can be detected by the electric quantity detecting device.

The step A2 is to, when the charging plug is electrically connected with the charging dock, determine, by the electronic product, whether the current electric quantity is greater than a second threshold. In other words, when the current electric quantity is greater than the second threshold, it indicates that the battery of the electronic product has been fully charged.

The step A3 is to, when the current electric quantity is greater than the second threshold, control the charging dock to be disconnected with a power supply.

The step A4 is to control the first magnetic device to be demagnetized. Specifically, the first magnetic device may be an electromagnet, and the first magnetic device may be controlled to be demagnetized by powering off a circuit in which the first magnetic device is.

The step A5 is to retract, by the electronic product, the charging cable connected with the charging plug. Specifically, the communication circuit in the charging dock sends the instruction message to the electronic product, thereby enabling the driving device to retract the charging cable connected with the charging plug.

Embodiments of the charging method of the present disclosure are described in details hereinafter.

The charging method according to one embodiment of the present disclosure includes: controlling the charging plug to attract the charging dock; determining whether the charging plug is electrically connected with the first charging terminal of the charging plug; and controlling the first charging terminal to be electrically connected with the power connection terminal. Then, since the first charging terminal is powered after the charging plug is electrically connected with the first charging terminal, safety of the charging system is improved.

In one embodiment, when the charging plug is not electrically connected with the first charging terminal, a first instruction message is sent to an electronic product to which the charging plug belongs. The first instruction message is used to instruct the electronic product to control the charging plug to attempt to try to electrically connect the first charging terminal of the charging dock. In this way, the charging plug is controlled to attempt to try to electrically connect the charging dock according to the first instruction message.

Specifically, the first detection device may be a pressure sensor, and the first charging terminal includes a charging dock positive electrode and a charging dock negative electrode. There are two first detection devices. When both of the two first detection devices detect pressure signals, it is determined that the first charging terminal is electrically connected with the charging plug. Then, a power connection terminal of the charging dock is electrically connected with the first charging terminal and supplies power for the charging plug.

Optionally, before controlling the charging plug to attract the charging dock, it is determined whether the charging plug is inserted in the charging dock; when the charging plug is inserted in the charging dock, the first magnetic device in the charging dock is controlled to generate a magnetic field, thereby enabling the charging plug to attract the charging dock. In this way, when the charging plug is inserted in the charging dock, the first magnetic device is magnetized, and then the charging plug is attracted to the charging dock under the effect of magnetic attraction.

Optionally, when the charging plug is inserted in the charging dock, a second instruction message is sent to an electronic product to which the charging plug belongs. The second instruction message is used to instruct the electronic product to control the charging plug to attempt to try to be inserted in the charging dock. Then, when the charging plug is inserted in the charging dock, the driving device is triggered to drive the charging plug to return back and then move towards the charging dock until the charging plug moves to the charging position.

Specifically, based on infrared induction, the second detection device of the charging dock detects whether the charging plug is inserted in the charging dock. Thus, the position of the charging plug is detected based on infrared induction, which is simple, has a high stability and provides an accurate detection result.

The charging method according to another embodiment of the present disclosure includes: detecting a current electric quantity of a battery of an electronic product; and releasing the charging cable connected with the charging plug when the current electric quantity is less than a first threshold. Then, automatic charging of the electric product can be realized.

Optionally, the method further includes: when the current electric quantity is greater than a second threshold, retracting the charging cable connected with the charging plug. Then, after the electric product is charged, the electric product is automatically disconnected with the power supply, thereby improving stability and safety of the charging system.

Specifically, the method further includes: when receiving the first instruction message sent from the charging dock, first retracting the charging cable connected with the charging plug and then releasing the charging cable connected with the charging plug. When the charging dock sends the first instruction message which indicates that the electrical connection between the charging plug and the second charging terminal is poor, the driving device retracts the charging cable, drives the charging plug to away from the charging dock and then moves towards the charging dock, thereby forming a good electrical connection between the charging plug and the second charging terminal and then improving charging efficiency and safety of the charging system.

Optionally, the method further includes: when receiving the second instruction message sent from the charging dock, first retracting the charging cable connected with the charging plug and then releasing the charging cable connected with the charging plug. In this way, the position of the charging plug relative to the charging dock is adjusted to enable the charging plug to be inserted in the charging dock, thereby improving stability of connection between the charging plug and the charging dock.

Embodiments of the present description all are described in a progressive manner, cross-reference may be made to identical or similar portions of the embodiments, and each embodiment focuses on differences from other embodiments.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein include some features and not other features included in other embodiment, a combination of features of different embodiments is indicative of being within the scope of the invention and forming a different embodiment. For example, in the following claims, any one of the claimed embodiments may be used in any combination. Embodiments of the individual components of the invention may be implemented in hardware, or in a software module running on one or more processors, or in a combination thereof.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of an apparatus including several distinct elements. In a unit claim enumerating several elements, several of the elements may be embodied by one and the same item. Use of the words first, second, and third, etc. does not mean any ordering. Such words may be construed as naming.

It will be apparent to those skilled in the art that various modifications and improvements can be made without departing from the spirit of the present invention, which fall within the scope of the present invention. Accordingly, the scope of protection of the present invention should be determined by the appended claims.

What is claimed is:

1. An electronic product comprising:
   an electric quantity detecting device;
   a driving device;
   a charging cable; and
   a charging plug;
   wherein the charging plug includes a connection terminal, a second charging terminal and a second magnetic device; and the connection terminal is configured to connect with the charging cable; the electric quantity detecting device is configured to detect an electric quantity of the electric product; and the driving device is configured to retract or release the charging cable connected to the charging plug according to the electric quantity of the electric product detected by the electric quantity detecting device.

2. The electronic product of claim 1, wherein the charging plug includes a flat curved mating portion at a lower portion of the charging plug; and the second charging terminal and the second magnetic device are on the flat curved mating portion.

3. The electronic product of claim 1, wherein the driving device is further configured to
   when the electric quantity of the electronic product is less than a first threshold, release the charging cable connected to the charging plug to enable the charging plug to attempt to connect with the charging dock; and/or
   when the electric quantity of the electronic product is greater than a second threshold when the charging dock charges the electronic product, retract the charging cable to enable the charging plug to escape from the charging dock.

4. The electronic product of claim 1, further comprising a communication circuit that is configured to receive an instruction message sent from the charging dock;
   wherein the instruction message is configured to indicate that the charging plug does not reach a charging position;
   the driving device is configured to, according to the instruction message received by the communication circuit, first retract the charging cable and then release the charging cable, thereby enabling the charging plug to attempt to connect with the charging dock.

5. The electronic product of claim 4, wherein the electric product is one of a smart picture frame and a smart photo frame.

6. A charging system for an electronic product comprising:
   a charging dock;
   a charging plug;
   an electric quantity detecting device;
   a charging cable; and
   a driving device;
   wherein the charging dock includes a housing, a first charging terminal, a first magnetic device, a first detection device and a first control circuit; the first charging terminal, the first magnetic device, the first detection device and the first control circuit are in the housing;
   wherein the charging plug includes a connection terminal, a second charging terminal and a second magnetic device; and the connection terminal connects with the charging cable; the electric quantity detecting device is configured to detect an electric quantity of the electric product; the driving device is configured to retract or release the charging cable connected to the charging plug according to the electric quantity of the electric product detected by the electric quantity detecting device;
   when releasing the charging cable connected to the charging plug, the first magnetic device engages with the second magnetic device, thereby enabling the second charging terminal to move towards the first charging terminal until the first charging terminal is connected with the second charging terminal;
   the first control circuit is configured to control the first charging terminal to be energized when the first detection device detects that the first charging terminal is coupled to the charging plug.

7. The charging system of claim 6, wherein the driving device includes a motor; and the charging cable is wound around an output shaft of the motor.

8. The charging system of claim 6, wherein the first magnetic device is an electromagnet, and the second magnetic device is a permanent magnet.

9. A charging method for the charging system of claim 6, comprising:
   enabling the second charging terminal to move towards the first charging terminal until the first charging terminal is connected with the second charging terminal by means of controlling the first magnetic device to be magnetized and interaction between the first magnetic device and the second magnetic device; and controlling the first charging terminal to be energized.

10. The charging method of claim 9, wherein before enabling the second charging terminal to move towards the first charging terminal until the first charging terminal is connected with the second charging terminal by means of controlling the first magnetic device to be magnetized and interaction between the first magnetic device and the second magnetic device, the method further includes:

detecting a current electric quantity of an electronic product;

when the current electric quantity is less than the first threshold, releasing the charging cable, thereby enabling the charging plug to move towards the charging dock.

\* \* \* \* \*